United States Patent
Morvant et al.

(10) Patent No.: US 8,870,530 B2
(45) Date of Patent: Oct. 28, 2014

(54) GAS TURBINE ENGINE

(75) Inventors: Romuald Morvant, Tamworth (GB); Kevin M. Britchford, Belper (GB)

(73) Assignee: Rolls-Royce PLC, London (GB)

( * ) Notice: Subject to any disclaimer, the term of this patent is extended or adjusted under 35 U.S.C. 154(b) by 831 days.

(21) Appl. No.: 13/087,870

(22) Filed: Apr. 15, 2011

(65) Prior Publication Data

US 2011/0268560 A1 Nov. 3, 2011

(30) Foreign Application Priority Data

Apr. 30, 2010 (GB) .................................. 1007215.5

(51) Int. Cl.
| | |
|---|---|
| *F01D 17/00* | (2006.01) |
| *F01D 25/16* | (2006.01) |
| *F02K 3/06* | (2006.01) |
| *F02K 1/34* | (2006.01) |
| *F01D 25/28* | (2006.01) |
| *F02C 7/20* | (2006.01) |

(52) U.S. Cl.
CPC .......... *F01D 25/162* (2013.01); *F05D 2240/14* (2013.01); *F02K 3/06* (2013.01); *B64D 33/06* (2013.01); *F01D 25/28* (2013.01); *F02C 7/20* (2013.01)
USPC ...................................................... 415/144

(58) Field of Classification Search
USPC .......................................... 415/220, 144, 145
See application file for complete search history.

(56) References Cited

U.S. PATENT DOCUMENTS

| | | | |
|---|---|---|---|
| 3,137,131 A | 6/1964 | Tyler et al. | |
| 5,369,954 A | 12/1994 | Stuart | |
| 6,139,259 A * | 10/2000 | Ho et al. ........................ | 415/119 |
| 6,502,383 B1 | 1/2003 | Janardan et al. | |
| 6,715,339 B2 * | 4/2004 | Bonne et al. .................. | 73/24.01 |
| 6,820,410 B2 | 11/2004 | Lair | |
| 7,472,543 B2 | 1/2009 | Papamoschou | |
| 7,758,296 B2 | 7/2010 | Borchers et al. | |
| 2002/0064453 A1 * | 5/2002 | Tse ................................ | 415/119 |
| 2005/0060983 A1 | 3/2005 | Lardellier | |
| 2008/0166227 A1 * | 7/2008 | Sheaf et al. .................... | 415/200 |
| 2009/0288387 A1 * | 11/2009 | Baltas ............................. | 60/204 |
| 2009/0324400 A1 * | 12/2009 | Marini et al. .................. | 415/189 |
| 2010/0038476 A1 * | 2/2010 | Gantie et al. .................. | 244/1 N |
| 2010/0300066 A1 | 12/2010 | Bulin et al. | |

FOREIGN PATENT DOCUMENTS

| | | |
|---|---|---|
| EP | 1 870 580 A2 | 12/2007 |
| EP | 1 876 328 A2 | 1/2008 |
| EP | 1 927 796 A1 | 6/2008 |
| EP | 1 936 172 A2 | 6/2008 |

(Continued)

OTHER PUBLICATIONS

Nov. 4, 2013 Partial Search Report issued in European Patent Application No. EP 11 16 2565.

(Continued)

*Primary Examiner* — Edward Look
*Assistant Examiner* — Aaron R Eastman
(74) *Attorney, Agent, or Firm* — Oliff PLC (57) ABSTRACT

A gas turbine engine has an annular bypass duct defined between a fan nacelle and a core fairing through which fan air is discharged. One or more bifurcator members are positioned inside the exit of the bypass duct to bifurcate the air flow in the bypass duct around the bifurcator members prior to exiting the bypass duct. The bifurcator members modify the flow field of the air in the bypass duct radially and/or tangentially with respect to the axis of the annular bypass duct.

12 Claims, 8 Drawing Sheets

(56) References Cited

FOREIGN PATENT DOCUMENTS

| | | |
|---|---|---|
| FR | 2 917 714 A1 | 12/2008 |
| GB | 1 345 835 A | 2/1974 |
| GB | 2 036 875 A | 7/1980 |
| WO | WO 2005/056984 A1 | 6/2005 |
| WO | WO 2007/096171 A1 | 8/2007 |
| WO | WO 2008/029062 A2 * | 3/2008 |
| WO | WO 2008/045053 A2 | 4/2008 |
| WO | WO 2008/045064 A1 | 4/2008 |
| WO | WO 2008/045091 A1 | 4/2008 |

OTHER PUBLICATIONS

Search Report issued in corresponding British Patent Application No. 1007215.5 dated Aug. 18, 2010.

* cited by examiner

GAS TURBINE ENGINE

The present invention relates to a gas turbine engine, and in particular to a gas turbine engine in which there is bifurcation of air flow through a bypass duct of the engine.

Aircraft noise is a major problem in the aircraft industry. Aircraft manufacturers are under continual pressure to reduce the amount of noise produced by aircraft, particularly during takeoff and landing. Significant noise can be caused by aircraft gas turbine engines. In particular, the downstream mixing of flow exiting from bypass and core sections of such an engine can generate jet noise.

Further noise can be generated due to various installation effects, especially for configurations in which a jet shear layer closely-couples to wing and/or flap surfaces. In particular, the proximity of the jet shear layer generated by the air leaving the engine to the wing and flap of the aircraft leads to acoustic pressure fluctuations that tend to propagate upstream of the wing. Although the noise generation mechanisms are not presently fully understood, it is apparent that the radiated noise from the interaction between the engine outflow and the wing flap is highly correlated with the shear layer strength.

Thus in order to reduce the noise generated by a gas turbine engine, it is desirable to exert control on the flow field of the air in the bypass or core ducts.

WO2008/045064A1 proposes a variable noise control system in which a controller is programmed to manipulate the core nozzle exit area, for example through the use of hinged flaps. This allows control of the gas flow speed and orientation. Reducing the velocity of the exhaust gas from the core flow reduces the jet noise. A disadvantage of such a method is that there is an increase in drag due to the formation of wake and recirculation regions behind the flaps.

US2008/0166227A1 similarly proposes a mechanism for controlling and varying a nozzle exit area. The nozzle exit area is varied using a member on the surface of the nozzle which can be deformed, for example using a mechanical actuator.

EP1936172A2 proposes an aircraft nozzle attachable to an aircraft turbofan engine wherein multiple flow passages are provided between the bypass and core flows and between the bypass flow and the ambient air, allowing mixing of the different flows. Increased mixing of the flows in the region of the engine nozzle reduces the jet noise caused by the subsequent mixing downstream of the engine.

U.S. Pat. No. 6,502,383B1 proposes the inclusion of circumferentially spaced apart stub airfoils in the engine ducts. The airfoils are disposed adjacent to the outlet of the bypass duct and the outlet of the core duct. The airfoils shed vortices which increase the mixing of the exhaust flow.

U.S. Pat. No. 6,820,410B2 and WO2008/045091A1 propose the use of flow path directors, and describe how the bypass or core flows can be controlled using moveable flaps and moveable inserts respectively. These can be used to vary the area of the engine nozzle during different stages of a flight, for example take off or cruising at altitude.

U.S. Pat. No. 7,472,543B2 proposes the use of stream path directors in the bypass or core ducts to bifurcate the flow and to direct part of the flow away from the central axis of the engine. The stream path directors are shown in the figures (for example FIG. 5 and FIG. 6) as spanning between the fan nacelle and the core shroud (i.e. core fairing), or between the core shroud and the core nozzle, in a radial direction of the engine. By adjusting the direction of part of the bypass or core flows the extent of mixing between the two flows downstream of the engine can be altered, thereby reducing the jet noise.

However, as the stream path directors disclosed in U.S. Pat. No. 7,472,543B2 deflect part of the flow using a lift force on the stream path directors, they are unable to alter the radial distribution of the air flow around the engine axis without also changing the direction of the central axis of the air flow. Including a stream path director in the core or bypass duct also increases the drag of the engine, particularly with larger stream path directors which are designed to deflect a substantial proportion of the air flow through the duct.

An object of the present invention is to exert control on the bypass flow of a gas turbine engine, in order to reduce the jet noise from the downstream mixing of the core and bypass flows and/or the installation noise caused by the interaction between the jet shear layer and the wing flaps of the aircraft.

Noise reduction can be achieved in a number of ways including deflection of the jet shear layer away from the wing flaps of the aircraft, reduction of the strength of the jet shear layer, enhanced mixing of the core and bypass flows and redistribution of the air flow in the vicinity of an attachment pylon for the engine.

In general terms, the present invention provides a gas turbine engine comprising:

a fan nacelle surrounding a core fairing to define an annular bypass duct there-between for discharging fan air; and one or more bifurcator members positioned inside the bypass duct which cause the air flow through the bypass duct to bifurcate around the bifurcator members prior to exiting the bypass duct.

A first aspect of the present invention provides a gas turbine engine comprising:

a fan nacelle surrounding a core fairing to define an annular bypass duct there-between for discharging fan air; and one or more bifurcator members positioned inside the bypass duct which cause the air flow through the bypass duct to bifurcate around the bifurcator members prior to exiting the bypass duct;

wherein the, or each, bifurcator member spans locations in the duct and, when viewed along the axis of the duct, appears as an elongate 2-dimensional projected shape which extends in its long direction between said locations and varies in width along its length.

The varying width of the projected shape produces a varying cross-sectional flow area in the bypass duct. This varying flow area can in turn cause pressure variations in the air flow around the bifurcator member and lead to the redistribution of the flow field in the vicinity of the bifurcator member. The flow field in the bypass duct can be redistributed around the bifurcator member in different manners through the use of a suitable variation in the width of the projected shape. Advantageously, the bifurcator member can alter the radial distribution of the air flow around the engine axis while maintaining the direction of the central axis of the air flow.

The gas turbine engine of the first aspect may have any one or, to the extent that they are compatible, any combination of the following optional features.

Conveniently, a bifurcator member of this aspect can be a bypass duct portion of an attachment pylon which attaches the engine to the aircraft, e.g. the wing of an aircraft. The bypass duct portion typically spans the bypass duct from the core fairing to the fan nacelle. The attachment pylon typically also includes a fairing portion which extends from the outside of the fan nacelle to the aircraft.

However, alternatively or additionally, one or more of the bifurcator members can be vanes which, typically, are circumferentially spaced from an attachment pylon. The vanes can also, for example, span between the core fairing and the fan nacelle.

Preferably, and particularly when the bifurcator members are such vanes, the maximum width of the projected shape of the, or each, bifurcator member can be less than 10% of the span of the member. This limits the drag caused by the presence of the member in the bypass duct. On the other hand, when a bifurcator member is a bypass duct portion of an attachment pylon, the maximum width of the projected shape of the bypass duct portion may be about 25% of the radial distance between the core fairing and the fan nacelle due to mechanical requirements and the need for the attachment pylon to carry fluid systems.

A suitable width variation of the projected shape may be one in which the width increases with distance from one end of the projected shape to the other end of the projected shape. This width increase may be uniform with distance along the span. Such a width variation can lead to the air flow around the bifurcator member being deflected from the thinner end of the projected shape towards the thicker end of the projected shape.

A second suitable width variation of the projected shape may be one in which the width increases from both ends of the projected shape towards a position of maximum width between the ends. Such a width variation can lead to the air flow around the bifurcator member being deflected from the thinner ends of the projected shape towards the position of maximum width.

Alternatively, the width of the projected shape may decrease from both ends of the projected shape towards a position of minimum width between the ends. In this case, the air flow around the bifurcator member can be deflected from the position of minimum width of the projected shape towards the thicker ends.

Another suitable width variation of the projected shape may be one where the projected shape has:

a first constant width section extending from one of said locations (e.g. the core fairing) to a transition position proximate to the other of said locations (e.g. the fan nacelle), and a second, shorter section extending from said transition position to the other of said locations, the second section increasing in width to a maximum width at the other of said locations and forming smooth, outwardly concave profiles on both sides of the second section. Such a projected shape can generate vortices in a region of the bypass duct proximate to other of said locations. Particularly when the other of said locations is the fan nacelle, these vortices can reduce the strength of the shear layer surrounding the outflow of air from the gas turbine engine. The strength of the interaction between the shear layer and the wing flaps of the aircraft may therefore be reduced, leading to a reduction in the installation noise of the engine.

In general, the chord of the bifurcator member (i.e. the distance between the leading and the trailing edge of the bifurcator member on a longitudinal cross-section containing the axial direction) can increase as the corresponding width (i.e. the width of the projected shape at the longitudinal cross-section containing the chord) increases. That is, the bifurcator member can lengthen in the axial direction as it widens. This can help to avoid flow separation and drag penalties.

The, or each, bifurcator member may span the annular bypass duct in a radial direction of the engine. The subsequent radial variation in the cross-sectional flow area of the bypass duct, due to the variation in width of the projected shape, can cause the flow field to be modified radially, altering the radial distribution of the flow around the central axis of the engine. For example, radial bifurcator members may be used to narrow or widen the angle of divergence of the outflow of the bypass duct, without altering the direction of the central axis of the flow.

Preferably, however, the, or each, bifurcator member spans the annular bypass duct in a non-radial direction of the engine. This enables circumferential deflection of the flow field as well as radial deflection. The positions of the bifurcator members may be driven by structural, mechanical and/or aerodynamic requirements.

Indeed, a second aspect of the present invention provides a gas turbine engine comprising:

a fan nacelle surrounding a core fairing to define an annular bypass duct there-between for discharging fan air; and one or more bifurcator members positioned inside the bypass duct which cause the air flow through the duct to bifurcate around the bifurcator members prior to exiting the bypass duct;

wherein the, or each, bifurcator member spans locations in the duct in a non-radial direction of the engine.

In the second aspect, typically the bifurcator member is a vane, which may be circumferentially spaced from an attachment pylon.

In the gas turbine engine of the first or second aspect, preferably, the, or each, bifurcator member has one or more discharge openings on the external surface thereof for discharging air into the bypass duct.

Indeed, a third aspect of the present invention provides a gas turbine engine comprising:

a fan nacelle surrounding a core fairing to define an annular bypass duct there-between for discharging fan air; and one or more bifurcator members positioned inside the bypass duct which cause the air flow through the bypass duct to bifurcate around the bifurcator member prior to exiting the bypass duct;

wherein the, or each, bifurcator member spans locations in the bypass duct and has one or more discharge openings on the external surface thereof for discharging air into the bypass duct.

Air blown from discharge openings at or adjacent to the trailing edge of the bifurcator member may be used to generate lift and to further deflect the flow field. In this manner, the bypass flow may be pushed downwards, decreasing the strength of the interaction between the shear layer and the wing of the aircraft and altering the mixing between the core and bypass outflows. This can reduce both the jet noise and the installation noise of the engine.

In the third aspect, a bifurcator member can be a bypass duct portion of an attachment pylon. Alternatively or additionally, one or more of the bifurcator members can be vanes which span the bypass duct and which may be circumferentially spaced from an attachment pylon.

The gas turbine engine of the third aspect, or the gas turbine engine of the first or second aspect in which the, or each, bifurcator member has one or more discharge openings, may have any one or, to the extent that they are compatible, any combination of the following optional features.

The discharge openings can be at or adjacent to the trailing edge of the, or each, bifurcator member.

The air discharged from the discharge openings may be taken from the engine compressor or from airflow over an external fairing, such as a fairing portion of an attachment pylon which connects the engine to the aircraft.

However, preferably, the, or each, bifurcator member further has:

one or more receiving openings on the external surface thereof for receiving an inflow of air from the bypass duct; and one or more passages for conveying the received air from the receiving openings to the discharge openings. For example, the receiving openings can be at or adjacent to the leading edge of the bifurcator member.

These openings and passages allow a portion of the air flow through the bypass duct to pass through the bifurcator member, rather than around it. There are a number of advantages associated with having such openings and passages in a bifurcator member. Firstly, they can reduce the drag caused by the presence of the bifurcator member in the bypass duct. This facilitates the inclusion of larger bifurcator members or a larger number of bifurcator members. It also allows larger variations in cross-sectional shape to be provided, which can lead to more significant pressure variations around the bifurcator member and increases in the extent of redistribution of the flow field.

Secondly, the air flow through the passages in the bifurcator member may be used to enhance and reinforce the redistribution of the flow field around the bifurcator member. This may be achieved by directing the air exiting a bifurcator member through the discharge openings in an appropriate direction.

The discharge and receiving openings may be located at any position on the surface of the bifurcator member. However, preferably, one or more passages convey received air from one or more receiving openings on or adjacent the leading edge of the bifurcator member to one or more discharge openings on or adjacent the trailing edge of the bifurcator member. This allows air to pass through substantially the entire axial extent of the bifurcator member.

Preferably, one or more of the receiving openings are positioned on the leading edge of the bifurcator member adjacent to the fan nacelle and/or the core fairing. This may help to control the boundary layer flow within the bypass duct and to reduce drag, thereby improving the aerodynamic profile of the flow field inside the bypass duct.

One or more of the passages may convey received air from one or more receiving openings on a lateral side of the bifurcator member (i.e. a side which is axially bounded by the leading and trailing edges of the member) to one or more discharge openings on the same and/or the opposing lateral side of the bifurcator member.

Typically, the air pressure at the receiving openings will be higher than the air pressure at the discharge openings. This establishes pressure gradients across the passages and can cause air flow in the regions surrounding the receiving openings to be preferentially directed into the receiving openings. This also has an advantage of increasing the extent to which the flow field is redistributed around a bifurcator member.

The velocity of the air flow through a passage conveying air between a receiving opening and a discharge opening may be altered by the discharge opening having a different area to the receiving opening. This can be used to increase the flow speed at certain positions in the bypass duct.

Various shaped openings can be used as the discharge and receiving openings, for example rectangular or elliptical shapes. The openings and the passages may be annular.

Preferably, the total area of the discharge openings of all the bifurcator members is less than 10% of the total area of the discharge nozzle (i.e. fan nozzle) through which the air flow exits the bypass duct. More preferably, however, the total area of the discharge openings is less than 2% of the total area of the discharge nozzle. Large total areas of the discharge openings, up to the 10% limit, can provide sufficient redirected flow to have an impact on jet mixing noise. Smaller total areas, up to the 2% limit, however, can still modify the flow field locally near the fan and/or the core fairing sufficiently to alter the strength of the jet shear layer and any secondary flow generated at the core fairing, but generally produce fewer losses.

Due to the dependence of the flow field in the bypass duct on the operating conditions of the engine, for example during take-off or cruising at altitude, it may be desirable to have air blowing through the bifurcator members only in certain situations. Thus, the, or each, bifurcator member may have at least one actuator which is operable to vary the amount of air conveyed between the receiving openings and the discharge openings. For example, the actuator can be operable to open and close the receiving and/or the discharge openings.

The gas turbine engine of the first, second or third aspect may have any one or, to the extent that they are compatible, any combination of the following optional features.

The, or each, bifurcator member may have an elongate, substantially teardrop shape on cross-sections containing the axial direction. Typically, the more pointed end of such a teardrop is at the trailing edge. Such cross-sections can help to reduce drag.

Preferably, the axial distance of the leading edge of the, or each, bifurcator member upstream from the mouth of the discharge nozzle through which the air flow exits the bypass duct is less than 3 times, and more preferably less than 2 times, the radial distance between the fan nacelle and the core fairing at the mouth of the discharge nozzle. Preferably the trailing edge of the, or each, bifurcator member is upstream from the mouth of the discharge nozzle by an axial distance which is less than 1.5 times, and more preferably less than 1 times, the radial distance between the fan nacelle and the core fairing at the mouth of the discharge nozzle. These axial distance limitations help to ensure that the changes to the air flow produced by the bifurcator member persist in the discharging air.

Preferably, the maximum chord of the, or each, bifurcator member (i.e. the maximum distance between the leading and the trailing edge of the bifurcator member on a longitudinal cross-section containing the axial direction) is less than 1.5 times, but greater than 0.1 times, the span of the bifurcator member. This can help to limit or avoid vibrational effects associated with longer bifurcator members.

Preferably, the maximum width of the, or each, bifurcator member (i.e. the maximum width of the projected shape of the bifurcator member when the member is viewed along the axis of the duct and appears as an elongate 2-dimensional projected shape which extends in its long direction between the locations in the duct spanned by the member) is less than 20% of the maximum chord of the member and/or is less than 10% of the span of the member. This helps to reduce the drag caused by the presence of the members in the bypass duct.

The above optional axial distance, maximum chord and maximum width limitations are most applicable when the bifurcator member is a vane which spans the bypass duct and which, typically, is circumferentially spaced from an attachment pylon. One or more of the bifurcator members may be positioned at or adjacent the top centre of the annular bypass duct. This allows the strength and/or location of the upper extremity of the jet shear layer to be altered. If the shear layer is deflected downwards towards the core fairing, the strength of the interaction between the shear layer and the wing flaps of the aircraft can be reduced, therefore reducing the installation noise. Alternatively, if vortices are generated in this region, the strength of the upper extremity of the shear layer can be reduced, again weakening the interaction between the shear layer and the wing flaps of the aircraft.

One or more of the bifurcator members may be positioned at or adjacent the bottom centre of the annular bypass duct.

This allows the strength and/or location of the lower extremity of the jet shear layer to be altered. One of the mechanisms causing jet mixing noise can thereby be altered.

One or more of the bifurcator members may extend between the fan nacelle and an attachment pylon for the engine. In this case, the flow field can be directed towards or away from the pylon, or straightened along the surface of the pylon, thereby limiting the recirculation of air behind the trailing edge of the pylon and decreasing the shear layer strength. This can lead to a reduction in the installation noise for close-coupled configurations. Alternatively, similar effects may be achieved by having a bifurcator member which extends between the core fairing and the attachment pylon.

One or more of the bifurcator members may extend from one position on the fan nacelle to a second position on the fan nacelle. This enables circumferential deflection of the flow field as well as radial deflection.

One or more of the bifurcator members may extend between the fan nacelle and the core fairing. This enables circumferential and radial deflection of the flow field, or purely radial deflection of the flow field.

Embodiments of the invention will now be described by way of example with reference to the accompanying drawings in which:

FIG. 1 shows schematically (a) an engine having a bifurcator member arrangement suitable for deflecting the flow field radially and for converging the outflow of the bypass duct (b) an engine having a bifurcator member arrangement suitable for deflecting the flow field radially and for diverging the outflow of the bypass duct, (c) a view from above of the bypass duct portion of the attachment pylon of either of the arrangements, and (d) a view from above of a vane of either of the arrangements;

FIG. 3 shows schematically (a) an engine having a bifurcator vane arrangement, (b) to (e) respective trailing edge views of bifurcator vanes for the further arrangement, the vanes having trailing edge discharge openings, and (f) detailed views on longitudinal cross-sections through a vane of the further arrangement of possible configurations for the vane trailing edge and the distribution of the discharge openings around that trailing edge;

FIG. 4 shows schematically (a) an engine having a further bifurcator vane arrangement, (b) and (c) respective leading edge views of bifurcator vanes for the further arrangement, the vanes having leading edge receiving openings and trailing edge discharge openings, (d) and (e) respective trailing edge views of bifurcator vanes for the further arrangement, the vanes also having leading edge receiving openings and trailing edge discharge openings, and (f) longitudinal cross-sections through vanes of the further arrangement illustrating possible configurations of the receiving and discharge openings;

FIG. 5 shows schematically (a) a side view and (b) a top view of a bifurcator vane which has openings on its lateral sides through which air can be conveyed, the openings being located in regions of different air pressure;

FIG. 7 shows schematically bifurcator vanes in different positions and orientations in a bypass duct of an engine in (a) a perspective view, (b) a cross-sectional view through the duct, and (c) to (e) respective views along the axis of the duct of possible bifurcator vanes with different projected shapes; and FIG. 8 shows schematically (a) a perspective view and (b) a cross-sectional view of an engine having a bifurcator vane arrangement in which two bifurcator vanes extending from opposite sides of the engine attachment pylon deflect air flow towards or away from the pylon.

Figure 1A:
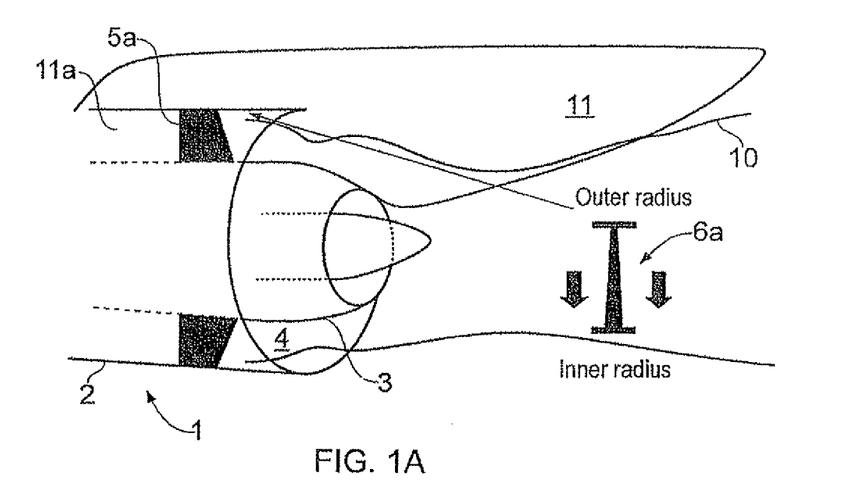
Figure 1B:
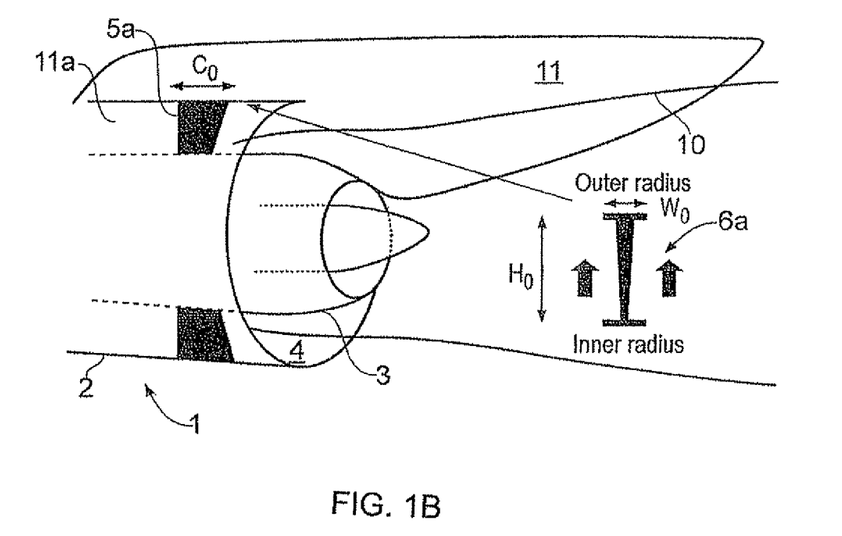

FIGS. 1(a) and (b) each show schematically a gas turbine engine 1 in which two bifurcator vanes 5a are positioned in an annular bypass duct 4 defined between a fan nacelle 2 and a core fairing 3. The two bifurcator vanes span the fan nacelle and the core fairing in a radial direction of the engine at the exit of the bypass duct. One bifurcator vane is positioned adjacent the top centre of the bypass duct, and the other is positioned at the bottom centre of the bypass duct. The upper bifurcator vane is adjacent an attachment pylon 11, which attaches the engine to the wing of an aircraft. The bifurcator vanes cause the air flow through the bypass duct to bifurcate around the vanes prior to exiting the bypass duct.

Views of the upper bifurcator vane of each engine, along the axis of the annular bypass duct, are also shown in FIGS. 1(a) and (b). When viewed along the axis of the duct, each bifurcator vane appears as an elongate 2-dimensional projected shape 6a. The long direction of the projected shape spans the nacelles, and the width of the shape increases with distance from one end of the projected shape to the other end of the shape. As shown in FIGS. 1(a) and (b), the width varies uniformly with distance along the length, although other width variation configurations are possible. The bifurcator vanes extend axially along the annular bypass duct.

In FIG. 1(a) the bifurcator vanes 5a are positioned with the thinner end of the projected shape 6a adjacent to the fan nacelle 2. The varying width of the projected shape of the bifurcator vanes leads to a radially varying cross-sectional flow area in the bypass duct 4. Due to the pressure differences which this induces, the air flow in the bypass duct around the bifurcator vanes is deflected (as indicated by arrows) from the thinner end of the projected shape, adjacent to the fan nacelle, towards the thicker end of the projected shape, adjacent to the core fairing 3. This causes the upper and lower positions of a shear layer 10 bounding the outflow of air from the engine 1 to be deflected inwards towards the central axis of the engine, thereby reducing the divergence of the outflow of air from the bypass duct.

As the upper position of the shear layer 10 is deflected downwards towards the core fairing 3, the strength of the interaction between the shear layer and the wing flaps of the aircraft may be reduced. This may reduce the installation noise of the engine and change the jet mixing noise. A bypass duct portion 11a of the pylon 11 spans the annular bypass duct 4 between the fan nacelle 2 and the core fairing 3. The air flow through the bypass duct also bifurcates around this portion 11a prior to exiting the bypass duct. Further, when viewed along the axis of the duct, the portion 11a appears as an elongate 2-dimensional projected shape with the long direction of the projected shape extending between the nacelles. Thus, like the projected shapes of the bifurcator vanes 5a, the projected shape of the portion 11a can vary in width along its length. This width variation can also be used to deflect the air flow in the bypass duct.

FIG. 1(b) illustrates an arrangement where the bifurcator vanes 5a are positioned with the thinner end of the projected shape 6 adjacent to the core fairing 3. The air flow in the bypass duct 4 around the bifurcator vanes is deflected towards the fan nacelle 2. This increases the divergence of the outflow of air from the bypass duct. Such an arrangement can be beneficial, for example, when used in conjunction with a bypass duct portion 11a of the pylon 11 which deflects the flow downwardly. The flow deflected downwards by the pylon can then mix with the flow deflected upwards by the lower bifurcator vane.

Figure 1C:
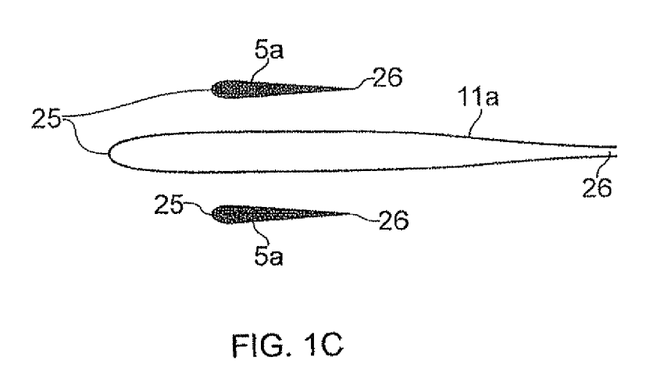
Figure 1D:
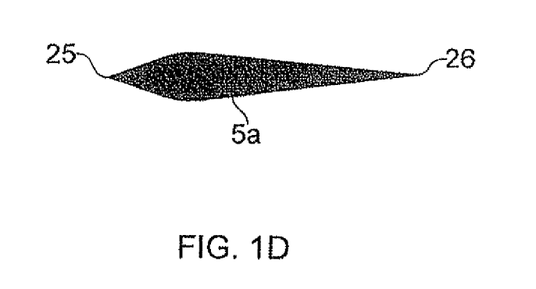

FIG. 1(c) shows schematically a view from above of the bypass duct portion 11a of the pylon 11 of the engine of FIG. 1(a) or (b). Upper bifurcator vanes 5a are located on either side of the portion 11a. Both the portion 11a and the vanes have relatively rounded leading edges 25 and relatively sharp trailing edges 26, producing elongate, teardrop-shaped, longitudinal cross-sections which can help to reduce drag. FIG. 1(d) shows schematically a view from above of a single bifurcator vane 5a, and illustrates an alternative shape for the longitudinal cross-sections, which although still substantially teardrop-shaped, is has a relatively sharp leading edge.

As shown in FIGS. 1(a) and (b), the chord of the bifurcator member 5a (i.e. the distance between the leading and the trailing edge of the bifurcator member on a longitudinal cross-section containing the axial direction) can increase as the corresponding width (i.e. the width of the projected shape 6a at the longitudinal cross-section containing the chord) increases. Increasing the chord in this way can help to avoid flow separation and drag penalties.

In general, the maximum width $W_0$ of the bifurcator vanes 5a should be less than 20% of the maximum chord $C_0$ of the vanes. This helps to reduce the drag caused by the presence of the vanes in the bypass duct. However, for mechanical stability reasons the maximum width $W_0$ can be greater than 10% of the maximum chord $C_0$.

For similar drag reduction considerations, the maximum width $W_0$ of the bifurcator vanes 5a is preferably less than 10% of the span $H_0$ of the vanes.

Relative to the span of the vanes 5a, the maximum chord $C_0$ can vary significantly. For example, typically it is greater than 10% of the span $H_0$ but less than 1.5 times the span.

Figure 2:
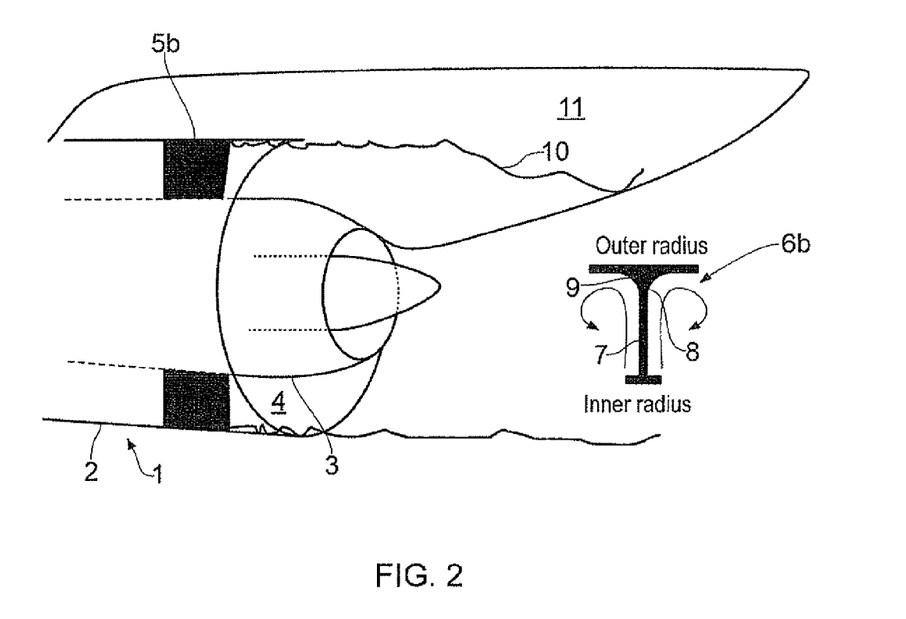
FIG. 2 shows schematically an engine having a bifurcator vane arrangement suitable for producing vortices in regions adjacent to the fan nacelle.

FIG. 2 shows schematically a gas turbine engine having an arrangement of upper and lower bifurcator vanes 5b similar to the arrangements shown in FIGS. 1(a) and (b). A view of the upper bifurcator vane, along the axis of the annular bypass duct, is also shown in FIG. 2. Each of the bifurcator vanes, when viewed along the axis of the duct, again appears as an elongate 2-dimensional projected shape 6b. However, the projected shape comprises a first section 7 and a second section 9. The first section has a constant width and extends in a radial direction of the engine from the core fairing to a transition position 8 adjacent to the fan nacelle. The second section extends from the transition position in the same radial direction as the first section and has a width which rapidly increases with distance from the first section, such that the sides of the second section form outwardly concave curves. Such a projected shape is suitable for generating vortices (as indicated by arrows) in a region of the bypass duct adjacent to the fan nacelle. In particular, vortices are generated at the top centre and at the bottom centre of the bypass duct. These vortices may act to reduce the strength of the shear layer 10 and subsequently to reduce the strength of the interaction between the shear layer and the wing flaps of the aircraft, thereby lessening the installation noise of the aircraft.

If the projected shape 6b is reversed so that the first section 7 extends in a radial direction of the engine from the fan nacelle to a transition position 8 adjacent to the core fairing, then the vortices can be generated in a region of the bypass duct adjacent to the core fairing. This can improve mixing of the bypass and core flows.

Figure 3:
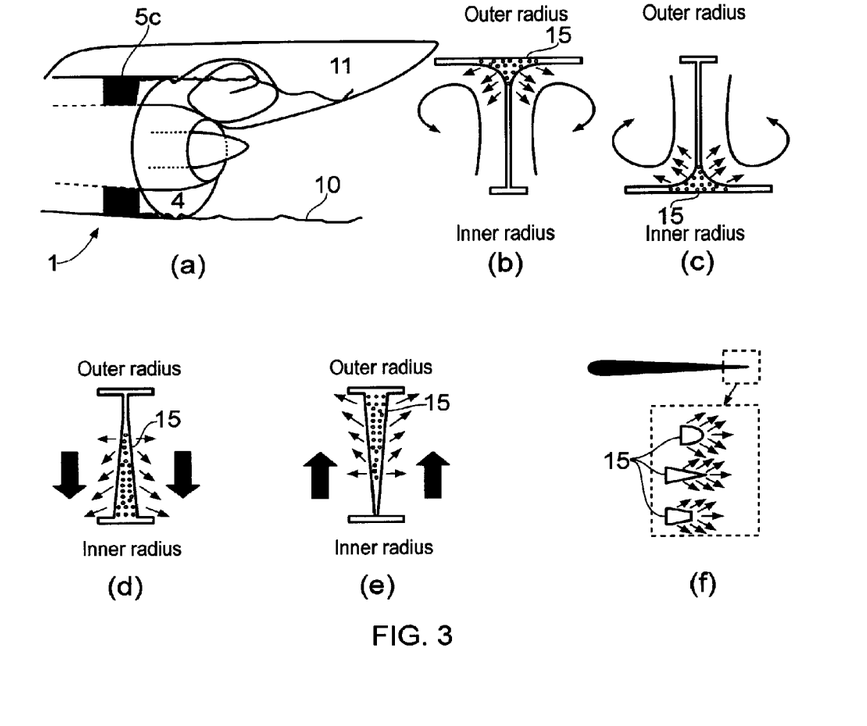

FIG. 3(a) shows schematically an arrangement of upper and lower bifurcator vanes 5c similar to the arrangement of vanes 5a shown in FIGS. 1(a) and (b). FIGS. 3(b) to (e) show respective trailing edge views of the upper bifurcator vane of the engine (i.e. views along the axis of the bypass duct 4 from the downstream side of the vane). FIG. 3(b) and (c) show bifurcator vanes having elongate projected shapes similar to that of the vane 5b shown in FIG. 2. FIG. 3(d) and (e) show bifurcator vanes having projected shapes similar to that of the vane 5a shown in FIGS. 1(a) and (b). In the arrangements of FIGS. 3(b) to (e), however, there are discharge openings 15 on and adjacent the trailing edges of each bifurcator vane. Air is blown out of the discharge openings, the air supply being taken from, for example, the compressor section of the engine or from air flow over the external fairing of the attachment pylon 11. The airflow from the discharge openings reduces the drag caused by the presence of the bifurcator vanes in the bypass duct.

FIG. 3(f) shows schematically detailed views on longitudinal cross-sections through the vane 5c of possible configurations for the trailing edge of the vane and the distribution of the discharge openings 15 around the trailing edge.

Figure 4:
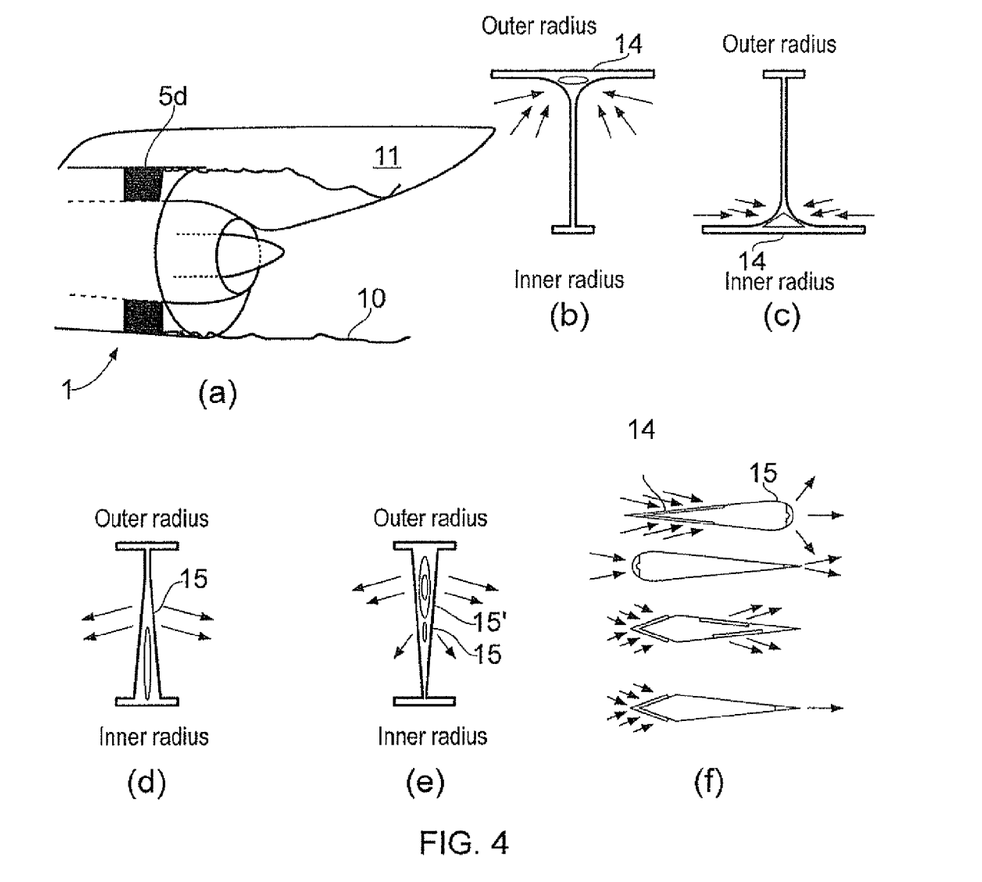

FIG. 4(a) shows schematically an engine having an arrangement of upper and lower bifurcator vanes 5d similar to those shown in FIGS. 1(a) and (b). FIGS. 4(b) and (c) show respective leading edge views of the upper bifurcator vane of the engine (i.e. views along the axis of the bypass duct 4 from the upstream side of the vane), and FIGS. 4(d) and (e) show respective trailing edge views of the upper bifurcator vane of the engine. The vanes of FIGS. 4(b) and (c) have elongate projected shapes similar to that of the vane 5b shown in FIG. 2. The vanes of FIG. 4(d) and (e) have elongate projected shapes similar to that of the vane 5a shown in FIGS. 1(a) and (b). In the arrangements of FIG. 4(b) to (e), however, one or more receiving openings 14 (shown in FIGS. 4(b) and (c)) are formed at or adjacent the leading edge each bifurcator vane to receive an inflow of air from the bypass duct 4. One or more discharge openings 15, 15' (shown in FIGS. 4(d) and (e)) are formed at or adjacent the trailing edge of the vane, the discharge openings being connected to the receiving openings by internal passages through the vanes. Thus unlike the discharge openings of FIG. 3, a portion of the air flow through the bypass duct passes out of the discharge openings of FIG. 4. This enhances the possibilities for manipulating the flow of air through and from the duct. In particular, the vanes can have larger projected shapes, or more vanes can be provided in the duct, while still maintaining drag losses at an acceptable level. Further the flow of air through the vanes can enhance and reinforce the redistribution of the flow field around the bifurcator vane.

The receiving 14 and discharge 15, 15' openings of FIGS. 4(b) to (e) have larger areas than the discharge openings of FIGS. 3(b) to (e). This is to reduce frictional losses within the vanes 5d, and to encourage the diversion of duct air flow through the vanes.

The vane 5d of FIG. 4(e) has an annular discharge opening 15', which is linked to a corresponding annular receiving opening elsewhere on the surface of the bifurcator vane by an annular passage which conveys air between them. Annular openings may promote flow through the bifurcator vane.

FIG. 4(f) shows schematically four possible longitudinal cross-sections through the vane 5d, and illustrates the positions of the receiving 14 and discharge 15 openings around respectively the leading and trailing edges. The cross-sections are all substantially teardrop shaped. However, the first cross-section has the pointed end of the teardrop at the leading edge, while the second, third and fourth cross-sections have the pointed end of the teardrop at the trailing edge. While the configuration of the second, third and fourth cross-sections is normally the more aerodynamic, the diversion of air flow through the receiving and discharge openings can make the configuration of the first cross-section feasible.

Figure 5:
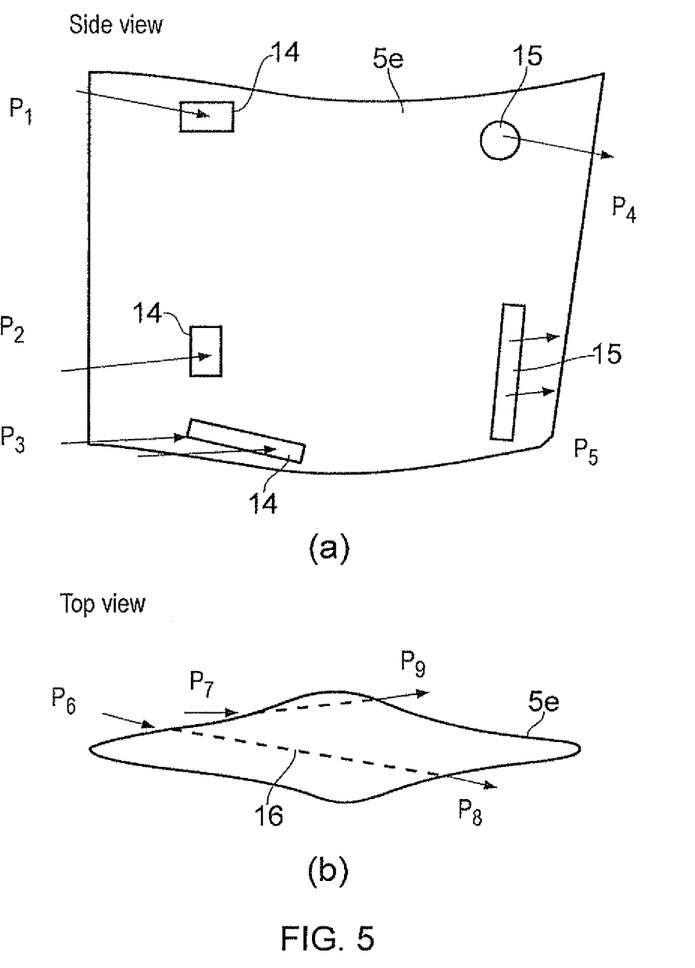

FIG. 5 shows schematically (a) a side view and (b) a top view of a bifurcator vane 5e having receiving 14 and discharge 15 openings located on a lateral side of the bifurcator vane. The openings can be rectangular or elliptical and are connected by internal passages. Connected receiving and discharge openings have different shapes and areas, thereby causing the velocity of the air flow through the passages to change between the receiving openings and the discharge openings. FIG. 5(b) shows that the discharge openings may be located on the same lateral side of the bifurcator vane as the receiving opening to which it is connected, or they may be located on an opposing side so that one or more of the connecting passages 16 span the width of the bifurcator vane. The air pressures at the receiving openings ($P_1$, $P_2$, $P_3$, $P_6$, $P_7$) are higher than the air pressures at the discharge openings ($P_4$, $P_5$, $P_8$, $P_9$). In this way, pressure gradients are established between the receiving and discharge openings and air flow in the regions around the receiving openings may be preferentially directed into the receiving openings. This effect may be used to increase the extent of the redirection of the air flow around the bifurcator vane.

Figure 6:
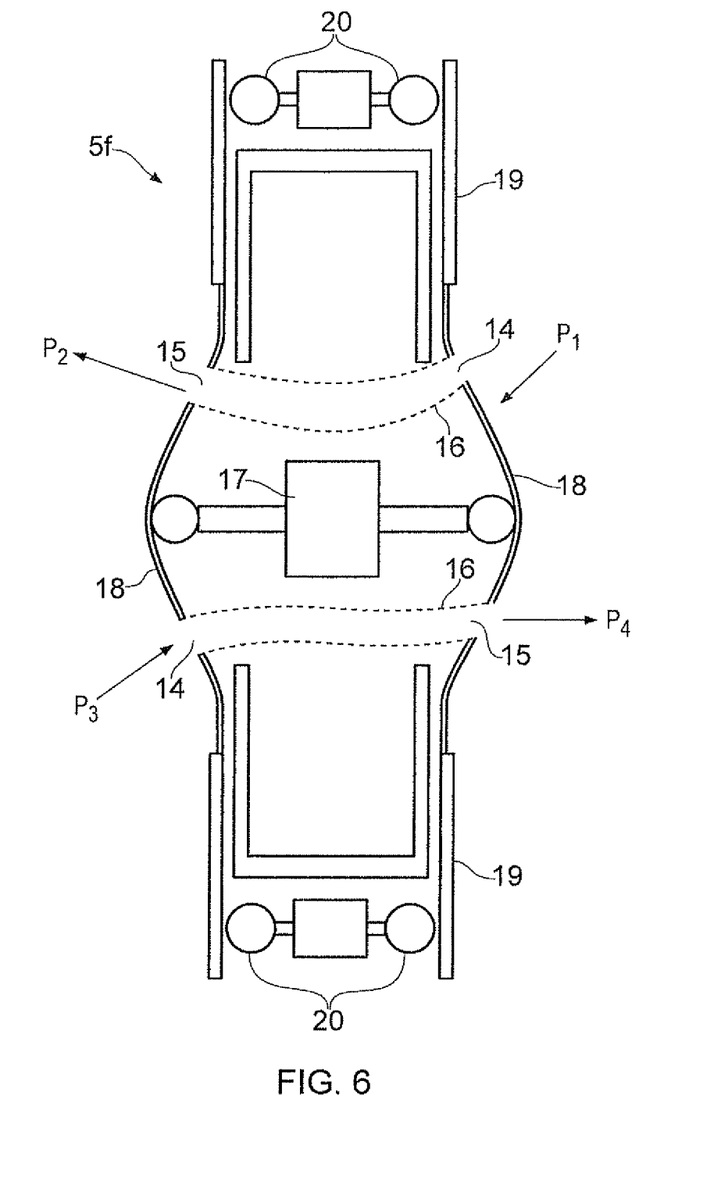
FIG. 6 shows schematically a plan view of a bifurcator vane having an actuator to open or close openings on its surfaces.

FIG. 6 shows schematically a plan view of a bifurcator vane 5f having an actuator system for opening or closing receiving 14 and discharge 15 openings on its surface. The opposing surfaces 18 of the bifurcator vane are moveable and deformable by the extension and retraction of actuator 17, the surfaces being supported on rollers 20, as explained in US2008/0166227A1. In the retracted state, portions of the surfaces forming the openings are contained in housings 19. On extension of the actuator, the opposing surfaces bulge outwardly, exposing more surface portions outside the housings, including those portions forming the openings. Respective passages 16 connecting pairs of receiving and discharge openings from $P_1$ to $P_2$ and from $P_3$ to $P_4$, although indicated in FIG. 16 by dotted lines can simply be the hollow interior of the bifurcator vane. If necessary, an internal dividing wall (e.g. at least partly formed by the actuator) can ensure that air flows from $P_1$ only to $P_2$ and from $P_3$ only to $P_4$. This system may be used to vary the amount of air blowing through the bifurcator vane at different stages of a flight, for example during take off or cruising at altitude.

Figure 7:
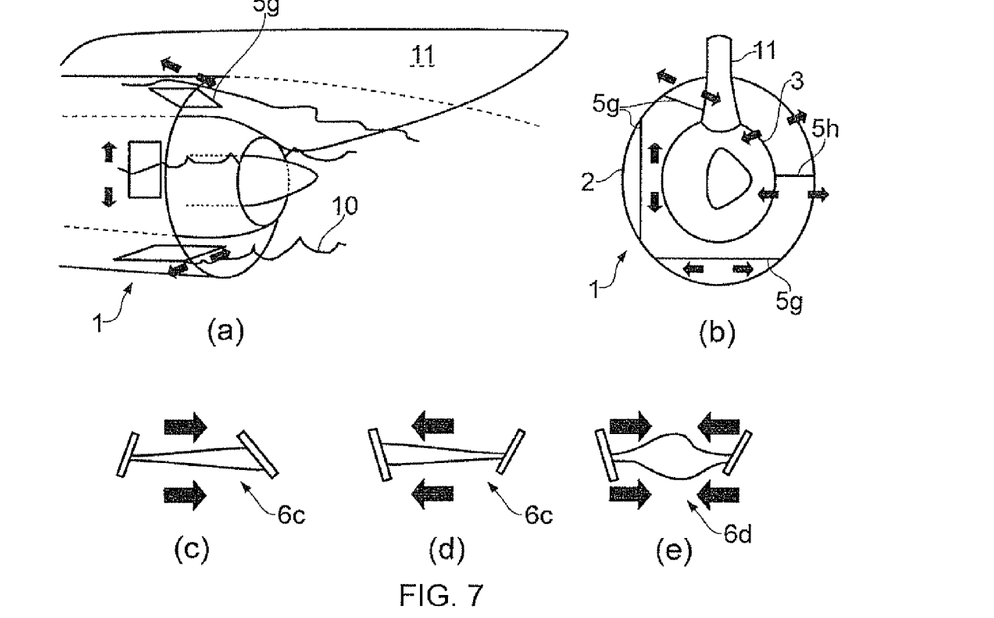

FIG. 7 shows schematically bifurcator vanes 5g, 5h in different positions and orientations within the bypass duct 4 of a gas turbine engine 1 in (a) a perspective view and (b) a cross-sectional view through the duct. Bifurcator vanes can extend, for example, between the fan nacelle 2 and the core fairing 3 in non-radial 5g and radial 5h directions of the engine, between the fan nacelle and the attachment pylon 11, and between two different positions on the fan nacelle. The placement of the bifurcator vanes within the bypass duct may be influenced by structural, mechanical and aerodynamic requirements.

An advantage of having a bifurcator vane extending in a non-radial direction of the engine 1 is that it facilitates circumferential deflection of the air flow as well as radial deflection. This may make it possible, for example, to direct air flow towards or away from the attachment pylon 11.

FIGS. 7(c) to (e) show respective views, along the axis of the duct, of non-radial bifurcator vanes, and illustrate possible projected shapes 6c, 6d for the vanes. The shapes 6c of FIGS. 7(c) and (d) are similar to the shapes 6a discussed above in relation to FIG. 1, the width of the shapes increasing uniformly with distance from one end to the other. Due to the pressure variations which this width variation induces, the air flow is deflected from the thinner end of the shapes towards the thicker end of the shapes. The shape 6d of FIG. 7(e) has a width which increases from both ends of the shape towards a position of maximum width between the ends. With such a projected shape, the air flow around the bifurcator vane is deflected from the thinner ends of the projected shape towards the position of maximum width.

Figure 8:
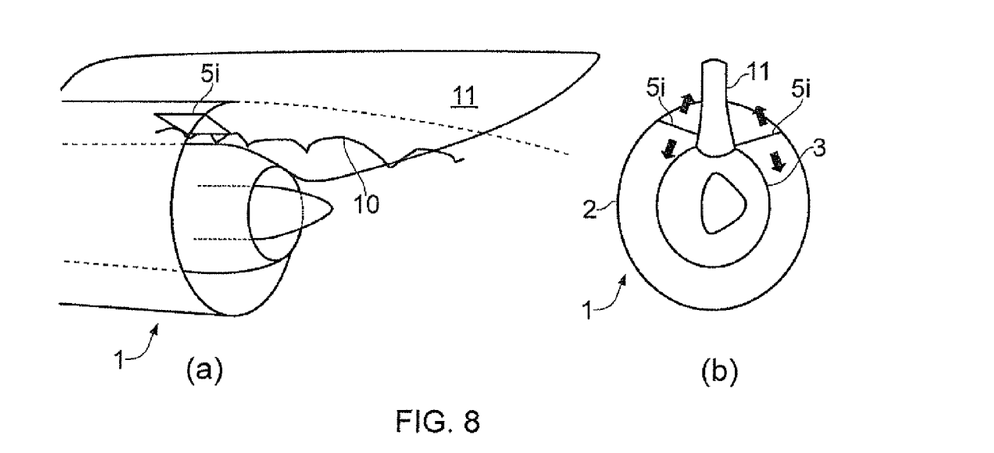

FIG. 8 shows schematically (a) a perspective view and (b) a cross-sectional view of a gas turbine engine having an arrangement in which two bifurcator vanes 5i are positioned in the bypass duct 4 to extend between the fan nacelle 2 and the attachment pylon 11. The bifurcator vanes may deflect air towards or away from the pylon. Similar effects may instead be achieved by having bifurcator vanes extending between the core fairing 3 and the pylon. By changing the air flow around the pylon, the extent of recirculation of air occurring around the trailing end of the pylon may be limited. Additionally, the strength of the shear layer 10 in this region may be reduced, thereby leading to a reduction in the engine noise.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references mentioned above are incorporated by reference.

The invention claimed is:

1. A gas turbine engine comprising:
   a fan nacelle surrounding a core fairing to define an annular bypass duct there-between for discharging fan air; and
   one or more bifurcator members positioned inside the bypass duct which cause the air flow through the duct to bifurcate around the bifurcator members prior to exiting the bypass duct;
   wherein the, or each, bifurcator member spans locations in the duct in a non-radial direction of the engine, and at least one of the one or more bifurcator members:
   (a) extend between the fan nacelle and an attachment pylon for the engine;
   (b) extend from one position on the fan nacelle to a second position on the fan nacelle; or
   (c) extend between the core fairing and the attachment pylon for the engine.

2. The gas turbine engine of claim 1 wherein the, or each, bifurcator member has one or more discharge openings on an external surface thereof for discharging air into the bypass duct.

3. The gas turbine engine of claim 2, wherein the, or each, bifurcator member further comprises:
   one or more receiving openings on the external surface thereof for receiving an inflow of air from the bypass duct; and
   one or more passages for conveying the received air from the receiving openings to the discharge openings.

4. The gas turbine engine of claim 3 wherein one or more of the passages convey air from one or more receiving openings on a leading edge of the bifurcator member to one or more discharge openings on a trailing edge of the bifurcator member.

5. The gas turbine engine of claim 3 wherein one or more of the passages convey air from one or more receiving openings on a lateral side of the bifurcator member to one or more discharge openings on the same and/or the opposing side of the bifurcator member.

6. The gas turbine engine of claim 3 wherein the bifurcator member has at least one actuator which is operable to vary the amount of air conveyed between the receiving openings and the discharge openings.

7. A gas turbine engine comprising:
- a fan nacelle surrounding a core fairing to define an annular bypass duct there-between for discharging fan air; and
- one or more bifurcator members positioned inside the bypass duct which cause the air flow through the bypass duct to bifurcate around the bifurcator members prior to exiting the bypass duct;
- wherein the, or each, bifurcator member spans locations in the duct and, when viewed along the axis of the duct, appears as an elongate 2-dimensional projected shape which extends in a long direction between the locations and varies in width along a length, wherein the 2-dimensional projected shape includes:
  - a first constant width section extending from one of the locations to a transition position proximate to the other of the locations, and
  - a second section extending from the transition position to the other of the locations, the second section shorter than the first section, the second section increasing in width to a maximum width at the other of the locations and forming smooth, outwardly concave profiles on both sides of the second section.

8. The gas turbine engine of claim 7 wherein a maximum width of the projected shape of the, or each, bifurcator member is less than 10% of the span of the member.

9. The gas turbine engine of claim 7 wherein a chord of the bifurcator member increases as the corresponding width increases.

10. A gas turbine engine comprising:
- a fan nacelle surrounding a core fairing to define an annular bypass duct there-between for discharging fan air; and
- one or more bifurcator members positioned inside the bypass duct which cause the air flow through the bypass duct to bifurcate around the bifurcator members prior to exiting the bypass duct;
- wherein the, or each, bifurcator member spans locations in the duct and, along the axis of the duct, appears as an elongate 2-dimensional projected shape which extends in a long direction between the locations and varies in width along a length, the width increasing uniformly with distance from one end of the projected shape to another end of the projected shape.

11. The gas turbine engine of claim 10 wherein a maximum width of the projected shape of the, or each, bifurcator member is less than 10% of the span of the member.

12. The gas turbine engine of claim 10 wherein a chord of the bifurcator member increases as the corresponding width increases.

* * * * *